United States Patent
Opris

(10) Patent No.: US 12,528,448 B2
(45) Date of Patent: Jan. 20, 2026

(54) HYBRID ELECTRIC VEHICLE ENERGY MANAGEMENT DURING EXTREME OPERATING CONDITIONS

(71) Applicant: FCA US LLC, Auburn Hills, MI (US)

(72) Inventor: Cornelius N Opris, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 200 days.

(21) Appl. No.: 18/476,393

(22) Filed: Sep. 28, 2023

(65) Prior Publication Data

US 2025/0108786 A1    Apr. 3, 2025

(51) Int. Cl.
| | |
|---|---|
| *B60W 20/18* | (2016.01) |
| *B60W 10/06* | (2006.01) |
| *B60W 10/08* | (2006.01) |
| *B60W 10/30* | (2006.01) |
| *B60W 20/13* | (2016.01) |
| *B60W 20/15* | (2016.01) |

(52) U.S. Cl.
CPC ............ *B60W 20/18* (2016.01); *B60W 10/30* (2013.01); *B60W 20/13* (2016.01); *B60W 2510/0676* (2013.01); *B60W 2510/244* (2013.01)

(58) Field of Classification Search
None
See application file for complete search history.

(56) References Cited

U.S. PATENT DOCUMENTS

| | | | |
|---|---|---|---|
| 5,791,407 A * | 8/1998 | Hammons | B60H 1/034 |
| | | | 219/202 |
| 7,267,090 B2 | 9/2007 | Tamai et al. | |
| 9,067,475 B1 | 6/2015 | Jeong | |
| 9,156,332 B2 | 10/2015 | Yasui | |
| 9,333,831 B2 | 5/2016 | Lim et al. | |
| 11,001,249 B2 * | 5/2021 | Mazaira | B60W 50/082 |
| 11,577,578 B2 | 2/2023 | Salter et al. | |
| 2010/0050671 A1 | 3/2010 | Kahn et al. | |
| 2021/0094438 A1 * | 4/2021 | Ciccone | B60L 58/24 |

FOREIGN PATENT DOCUMENTS

DE     1506114    *   5/1973  ............. B64D 37/04

OTHER PUBLICATIONS

Machine English Translation of DE1506114 (Year: 2025).*

* cited by examiner

*Primary Examiner* — Thomas E Worden
*Assistant Examiner* — Atticus A Cameron
(74) *Attorney, Agent, or Firm* — Jeremy J. Klobucar

(57) ABSTRACT

An energy management technique for an electrified vehicle controls an electrified powertrain to maintain a fuel reserve in a fuel tank, wherein the fuel reserve is a threshold amount above a minimum amount of fuel that is kept in the fuel tank while indicating that the fuel tank is fully depleted, detects an operating condition of the electrified vehicle when (i) the fuel tank is depleted down to the fuel reserve and (ii) a battery system state of charge (SOC) is at or below a minimum SOC propulsion threshold and, in response to detecting the electrified vehicle operating condition, temporarily powers the engine using the fuel reserve in the fuel tank and utilize the engine to support a heating system of the electrified vehicle configured for at least window heating and/or defrosting.

18 Claims, 3 Drawing Sheets

HYBRID ELECTRIC VEHICLE ENERGY MANAGEMENT DURING EXTREME OPERATING CONDITIONS

FIELD

The present application generally relates to hybrid electric vehicles (HEVs) and, more particularly, to HEV energy management techniques during extreme operating conditions.

BACKGROUND

One type of electrified vehicle is a hybrid electric vehicle (HEV), which includes an internal combustion engine powered by combustion of air and fuel (gasoline, diesel, etc.) and at least one electric motor powered by a battery system. Abnormal or "extreme" operating conditions, such as very low ambient temperatures (also known as "cold soak" temperatures, e.g., approximately −15° Celsius), can greatly affect the operation of the electrified components (i.e., the battery system) and thereby make it difficult or impossible for the electrified vehicle to provide maximum functionality. When the electrified vehicle is out of fuel, a reserve amount of charge (state of charge, or "SOC") is typically kept available at the battery system for vehicle propulsion (e.g., to a recharge location). Other, non-propulsive functionality, such as heating/HVAC, is typically supported by the engine and its air/fuel combustion and thus could be limited or unavailable. Accordingly, while such conventional electrified vehicles do work for their intended purpose, there exists an opportunity for improvement in the relevant art.

SUMMARY

According to one example aspect of the invention, an energy management system for an electrified vehicle having an electrified powertrain including an internal combustion engine and an electric motor, is presented. In one exemplary implementation, the energy management system comprises a fuel level sensor configured to measure an amount of fuel remaining in a fuel tank, wherein the fuel is used for combustion by the engine, a state of charge (SOC) sensor configured to measure a SOC of a battery system configured to power the electric motor, and a controller configured to control the electrified powertrain to maintain a fuel reserve in the fuel tank, wherein the fuel reserve is a threshold amount above a minimum amount of fuel that is kept in the fuel tank while indicating that the fuel tank is fully depleted, detect an operating condition of the electrified vehicle when (i) the fuel tank is depleted down to the fuel reserve and (ii) the battery system SOC is at or below a minimum SOC propulsion threshold, and in response to detecting the electrified vehicle operating condition, temporarily power the engine using the fuel reserve in the fuel tank and utilize the engine to support a heating system of the electrified vehicle configured for at least window heating and/or defrosting.

In some implementations, the heating system is further configured for in-cabin heating while supported by the engine. In some implementations, the minimum amount of fuel kept in the fuel tank is for protection from sediments and/or cavitation. In some implementations, the minimum SOC propulsion threshold is greater than a minimum SOC operation threshold for preventing potential over-depletion degradation of the battery system. In some implementations, the controller is configured to control the electric motor of the electrified powertrain in a torque-limited manner using the battery system SOC in excess of the minimum SOC operation threshold. In some implementations, the energy management system further comprises an ambient temperature sensor configured to measure an ambient temperature of the electrified vehicle, and wherein the controller is configured to detect the operating condition when also (iii) the ambient temperature is less than a cold soak temperature threshold. In some implementations, the controller is configured to control the electrified powertrain to maintain the fuel reserve in the fuel tank in response to an enablement signal. In some implementations, the enablement signal is generated in response to a driver input or in response to detection of another set of one or more enablement conditions.

According to another example aspect of the invention, an energy management method for an electrified vehicle having an electrified powertrain including an internal combustion engine and an electric motor, is presented. In one exemplary implementation, the energy management method comprises providing (i) a fuel level sensor configured to measure an amount of fuel remaining in a fuel tank, wherein the fuel is used for combustion by the engine, and (ii) an SOC sensor configured to measure a SOC of a battery system configured to power the electric motor, controlling, by a controller, the electrified powertrain to maintain a fuel reserve in the fuel tank, wherein the fuel reserve is a threshold amount above a minimum amount of fuel that is kept in the fuel tank while indicating that the fuel tank is fully depleted, detecting, by the controller, an operating condition of the electrified vehicle when (i) the fuel tank is depleted down to the fuel reserve and (ii) the battery system SOC is at or below a minimum SOC propulsion threshold, and in response to detecting the electrified vehicle operating condition, temporarily powering, by the controller, the engine using the fuel reserve in the fuel tank and utilizing, by the controller, the engine to support a heating system of the electrified vehicle configured for at least window heating and/or defrosting.

In some implementations, the heating system is further configured for in-cabin heating while supported by the engine. In some implementations, the minimum amount of fuel kept in the fuel tank is for protection from sediments and/or cavitation. In some implementations, the minimum SOC propulsion threshold is greater than a minimum SOC operation threshold for preventing potential over-depletion degradation of the battery system. In some implementations, the controller is configured to control the electric motor of the electrified powertrain in a torque-limited manner using the battery system SOC in excess of the minimum SOC operation threshold. In some implementations, the method further comprises providing an ambient temperature sensor configured to measure an ambient temperature of the electrified vehicle, and wherein the controller is configured to detect the operating condition when also (iii) the ambient temperature is less than a cold soak temperature threshold. In some implementations, the controller is configured to control the electrified powertrain to maintain the fuel reserve in the fuel tank in response to an enablement signal. In some implementations, the enablement signal is generated in response to a driver input or in response to detection of another set of one or more enablement conditions.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, conventional electrified vehicles (e.g., hybrid electric vehicles, or "HEVs") typically maintain a small amount of battery system charge (state of charge, or "SOC") for vehicle propulsion when its fuel (gasoline, diesel, etc.) is fully depleted. Other, non-propulsive functionality, such as heating/HVAC, is typically supported by the engine and its air/fuel combustion and thus could be limited or unavailable. In addition, while the electrified vehicle could be periodically recharged, there may be longer periods between fuel refill events. Accordingly, improved energy management techniques for electrified vehicles at extreme operating conditions (e.g., very low ambient, or "cold soak" temperatures) are presented. These techniques control the electrified powertrain to enable a "reserve mode," where additional fuel is kept available for the purpose of supporting heating system functionality. This reserve mode could be activated, for example, in response to detection of cold soak ambient temperatures or calibratable thresholds (e.g., less than approximately −15° Celsius or similar). This reserve is in addition to or beyond an existing non-zero limits (shown as 0% fuel), which includes a small amount of fuel (e.g., for fuel tank sediment/cavitation protection). In some implementations, the propulsion capabilities of the electric motor(s) could be limited (e.g., a limp-home mode). In some implementations, these techniques could be further extended, with some modifications, to engine-only and motor-only (battery electric vehicle, or "BEV") applications.

Figure 1:
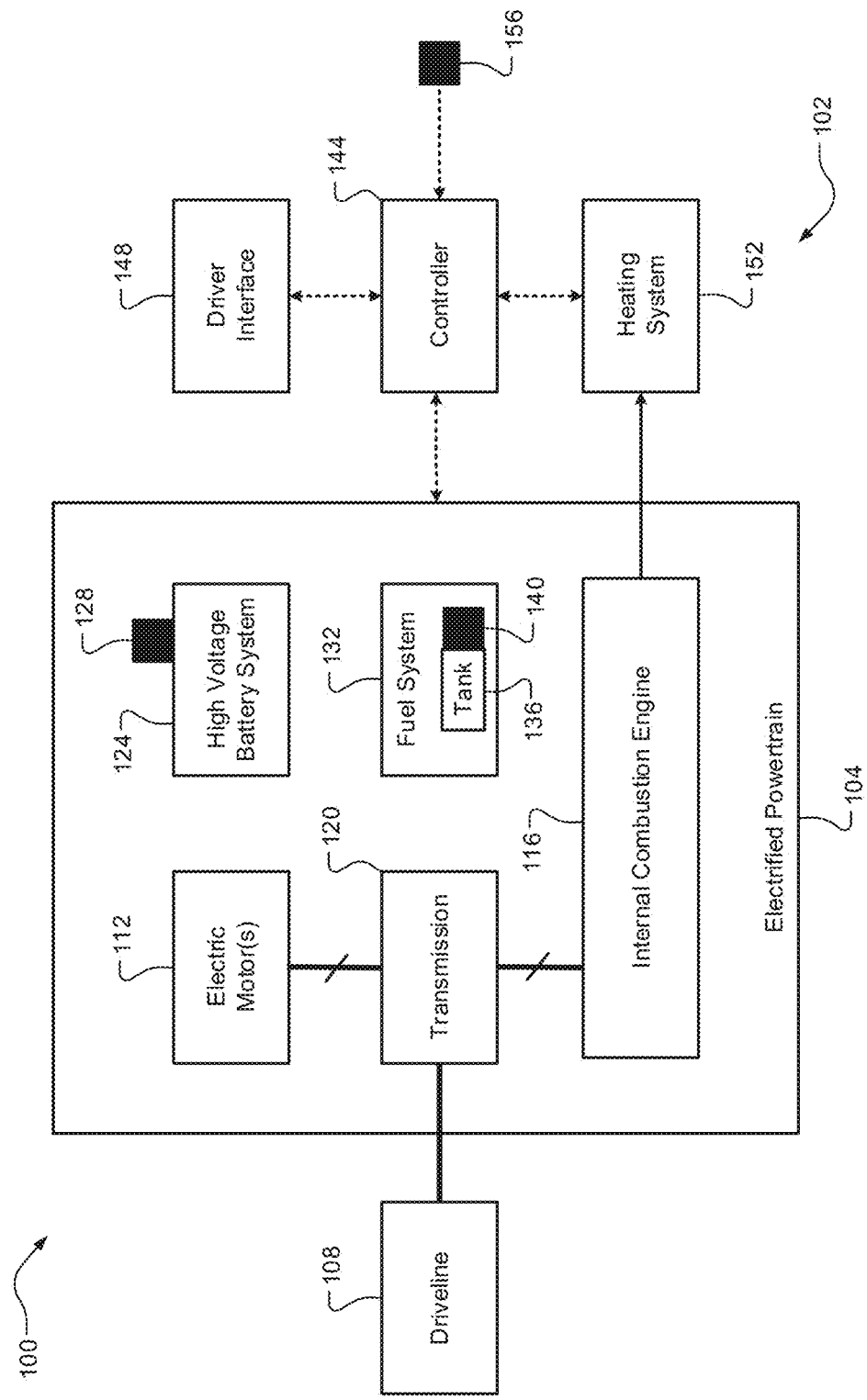
FIG. 1 is a functional block diagram of an electrified vehicle having a hybrid electrified powertrain and an example energy management system according to the principles of the present application.

Referring now to FIG. 1, a functional block diagram of an electrified vehicle 100 having an example energy management system 102 according to the principles of the present application is illustrated. The term "electrified vehicle" as used herein refers to a HEV (i.e., an electrified powertrain having an engine and at least one electric motor). This includes, for example, any suitable type of HEV (range-extended electrified vehicles, or REEVs, plug-in HEVs, or PHEVs, etc.). It will be appreciated that the techniques of the present application could also be extended to other types of electrified vehicles, such as battery electric vehicles (BEVs) without an engine, with some modifications.

The electrified vehicle 100 generally includes an electrified powertrain 104 configured to generate and transfer torque to a driveline 108 for vehicle propulsion. The electrified powertrain 104 includes at least one electric motor 112 (hereinafter, "electric motor 112") and an internal combustion engine 116 (hereinafter, "engine 116"). The electric motor 112 and the engine 116 are configured to collectively satisfy a torque request, which is transferred to the driveline 108 via a transmission 120, such as a multi-speed automatic transmission. The electric motor 112 is powered by electrical energy (i.e., current) from a high voltage battery pack or system 124 (hereinafter, "battery system 124").

An SOC sensor 128 is configured to measure the SOC of the battery system 124. It will be appreciated that the SOC of the battery system 124 could also be modeled or derived based on other measured parameter(s). The engine 116 is powered by fuel (gasoline, diesel, etc.) provided by a fuel system 132. More specifically, the engine 116 combusts a mixture of air and the fuel within cylinders (not shown) to drive pistons (not shown) and generate torque. The combustion of this air/fuel mixture also generates heat energy and thus the engine 116 is able to better support vehicle heating functionality, such as through mechanically powering accessory heating system components (e.g., via the engine's crankshaft) and/or a heat exchanger system (not shown).

The fuel system 132 generally includes a fuel tank 136 that houses and stores the fuel and other components (not shown) such as a fuel pump, fuel rail, and fuel injectors for delivering a desired amount of the fuel to the engine 116. A fuel level sensor 140 is configured to measure a level or amount of the fuel remaining in the fuel tank 136. A controller 144 is configured to control operation of the electrified vehicle 104, including primarily controlling the electrified powertrain 104 to satisfy a torque request from a driver (e.g., provided via a driver interface 148, such as an accelerator pedal). The controller 144 is also configured to perform at least a portion of the techniques of the present application, which will now be described in greater detail.

According to one aspect of the present application, a fuel reserve mode involves the controller 144 controlling the electrified powertrain 104 to maintain adequate/sufficient operation of a heating system 152 (e.g., a heating/ventilating/air conditioning, or HVAC system) of the electrified vehicle 100, particularly during extreme operating conditions such as low SOC/fuel cold soak temperature conditions. As part of this operation, the controller 144 is also configured to measure an ambient temperature of the electrified vehicle 100 using an external or internal ambient temperature sensor 156. In order to ensure or extend operability of the heating system 152 during low fuel/SOC and extreme operating conditions (e.g., cold soak temperatures), the controller 144 is configured to operate or control the electrified powertrain 104 such that the fuel reserve is maintained in the fuel tank 136. As previously mentioned, this fuel reserve amount/level is greater than or beyond a minimum amount of fuel (residual fuel) that is kept in the fuel tank while indicating that the fuel tank 136 is fully depleted, such as for the purpose of preventing or mitigating potential sediment and/or cavitation damage thereto.

Figure 2:
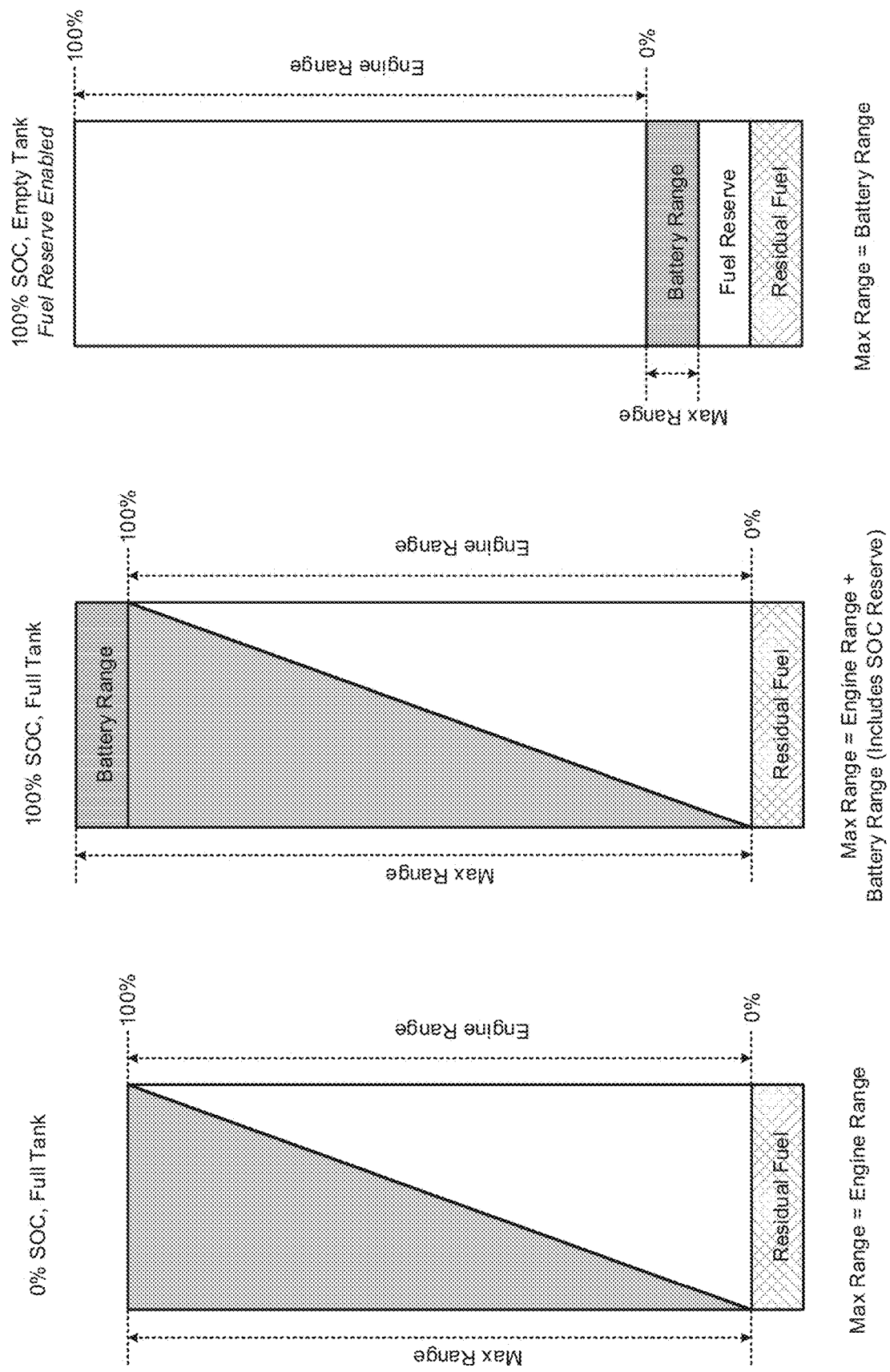
FIGS. 2A-2C are diagrams illustrating different battery system state of charge (SOC) and fuel tank reserves and corresponding vehicle ranges according to the principles of the present application.

Referring now to FIGS. 2A-2C and with continued reference to FIG. 1, diagrams of different battery system SOC and fuel tank reserves and corresponding vehicle ranges according to the principles of the present application are illustrated. In FIG. 2A, at 0% displayed SOC (i.e., a minimum SOC operation threshold for preventing potential over-depletion degradation of the battery system 124, such as ~18-20% SOC) and a full (e.g., ~100%) fuel tank, the maximum (max) range of the electrified vehicle 100 is the range capable by the engine 116 until the fuel tank 116 is depleted to the minimum amount of fuel (residual fuel). In FIG. 2B, at 100% SOC and a full fuel tank, the max range of the electrified vehicle 100 is a sum of the engine range (of FIG. 2A) and the range capable by the electric motor 112 until the battery system 124 is depleted to the minimum SOC operation threshold. This could include, for example, an SOC reserve range corresponding to a minimum SOC propulsion threshold (e.g., 20-30%) that is greater than the minimum SOC operation threshold. In other words, some SOC of the battery system 124 may be reserved for vehicle propulsion only, such as for torque-limited "limp-home" operation to give the electrified vehicle 100 a chance to reach a nearby recharging or service location. In FIG. 2O, the fuel reserve mode feature of the present application is enabled at 100% SOC and an empty fuel tank. As illustrated, a fuel reserve is maintained (in addition to or beyond the residual fuel) for supporting the heating system 152 and the battery system SOC (including a possible reserve SOC) is able to provide at least temporarily vehicle propulsion.

Figure 3:
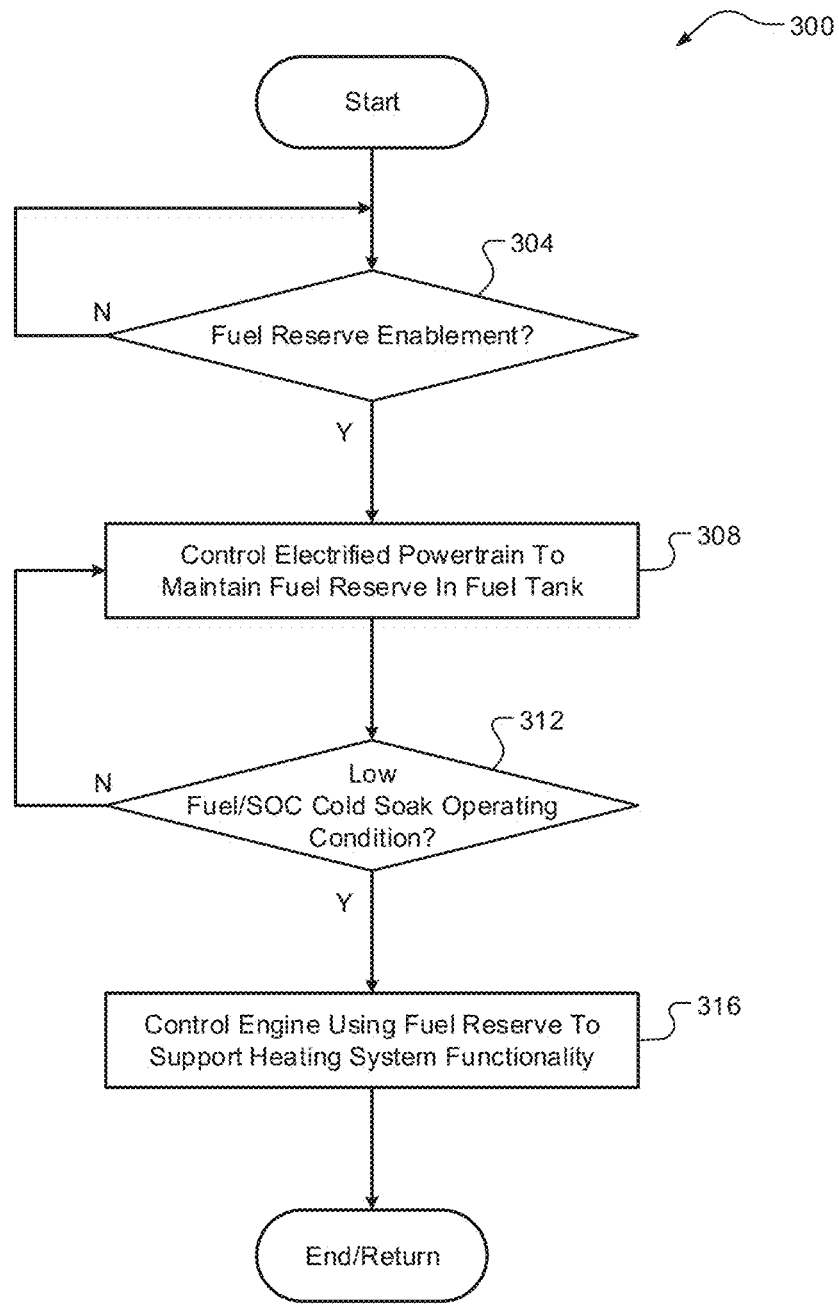
FIG. 3 is a flow diagram of an example energy management method for an electrified vehicle at low fuel/SOC cold soak temperature operating conditions according to the principles of the present application.

Referring now to FIG. 3, a flow diagram of an example energy management method 300 for an electrified vehicle according to the principles of the present application is illustrated. While the method 300 specifically references the electrified vehicle 100 and its components, it will be appreciated that the method 300 could be applicable to any suitable HEV. The method 300 begins at optional 304 where the controller 144 optionally detects whether an enablement signal for the fuel reserve mode has been generated. The enablement signal could be generated in response to a driver input (via the driver interface 148) or in response to detection of another set of one or more enablement conditions. This step 304 is described as being optional because the fuel reserve mode feature could always be enabled and thus there may be no need to detect for its enablement. However, it may be desirable to limit the usage of the fuel reserve mode to when explicitly requested by the driver or to when relatively cold ambient temperatures are detected are expected/forecasted so as to not reduce the fuel-based range of the electrified vehicle 100 unnecessarily. When the enablement signal is generated/detected, the method 300 proceeds to 308. Otherwise, the method 300 ends or returns to 304. At 308, the controller 144 controls the electrified powertrain 104 in the fuel reserve mode or, in other words, such that the fuel reserve is maintained in the fuel tank 136.

At 312, the controller 144 determines whether a particular operating condition is present. This operating condition is also described herein as a "low fuel/SOC and cold soak temperature" condition. This operating condition includes at least the fuel tank 136 being mostly depleted down to the fuel reserve level or minimum threshold and, in most cases, the SOC of the battery system 124 also being heavily depleted. In conjunction with these low SOC/fuel levels/thresholds, the ambient temperature of the electrified vehicle 100 could also be checked to see whether it is below a cold soak temperature threshold (e.g., approximately −15° Celsius). It will be appreciated that this cold soak temperature could vary depending on the particular vehicle application (e.g., engine design, insulation levels, etc.). When this operating condition is not present or detected, the method 300 returns to 308. When present/detected, however, the method 300 proceeds to 316 where the controller 144 controls the engine 116 to run/operate using the reserve fuel in the fuel tank 136. This operation of the engine 116 thereby supports the heating system 152 for at least temporary window heating and/or defrosting. In some cases, the heating system 152 is supported enough that temporary in-cabin heating is also achievable. The method 300 then ends or returns to 304.

It will be appreciated that the specific fuel and SOC levels (i.e., percentages) discussed herein are merely examples provided for descriptive purposes and that calibratable fuel/SOC thresholds could be utilized having values that are adjustable to desired levels based on various criteria such as hardware capabilities and the particular vehicle application. It will also be appreciated that a hysteresis could exist around a particular fuel/SOC threshold in order to avoid unnecessary or excessive toggling back/forth in/out of the reserve mode(s) as described herein.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An energy management system for an electrified vehicle having an electrified powertrain including an internal combustion engine and an electric motor, the energy management system comprising:
   a fuel level sensor configured to measure an amount of fuel remaining in a fuel tank, wherein the fuel is used for combustion by the engine;
   a state of charge (SOC) sensor configured to measure a SOC of a battery system configured to power the electric motor; and
   a controller configured to:
      determine a fuel reserve to maintain in the fuel tank, wherein the fuel reserve is only to be used by the engine to support a heating system of the electrified vehicle configured for at least window heating and/or defrosting;
      control the electrified powertrain to maintain the fuel reserve in the fuel tank, wherein the fuel reserve is a threshold amount above a minimum amount of fuel that is kept in the fuel tank while indicating that the fuel tank is fully depleted;
      detect an operating condition of the electrified vehicle when (i) the fuel tank is depleted down to the fuel reserve, (ii) the battery system SOC is at or below a minimum SOC propulsion threshold, and (iii) an ambient temperature is at or below a cold soak temperature threshold; and
      in response to detecting the electrified vehicle operating condition, temporarily power the engine using the fuel reserve in the fuel tank and utilize the engine to support the heating system for at least window heating and/or defrosting.

2. The energy management system of claim 1, wherein the heating system is further configured for in-cabin heating while supported by the engine.

3. The energy management system of claim 1, wherein the minimum amount of fuel kept in the fuel tank is for protection from sediments and/or cavitation.

4. The energy management system of claim 1, wherein the minimum SOC propulsion threshold is greater than a minimum SOC operation threshold for preventing potential over-depletion degradation of the battery system.

5. The energy management system of claim 4, wherein the controller is configured to control the electric motor of the electrified powertrain in a torque-limited manner using the battery system SOC in excess of the minimum SOC operation threshold.

6. The energy management system of claim 1, further comprising an ambient temperature sensor configured to measure the ambient temperature.

7. The energy management system of claim 1, wherein the controller is configured to control the electrified powertrain to maintain the fuel reserve in the fuel tank in response to an enablement signal.

8. The energy management system of claim 7, wherein the enablement signal is generated in response to a driver input or in response to detection of another set of one or more enablement conditions.

9. An energy management method for an electrified vehicle having an electrified powertrain including an internal combustion engine and an electric motor, the energy management method comprising:
   providing (i) a fuel level sensor configured to measure an amount of fuel remaining in a fuel tank, wherein the fuel is used for combustion by the engine, and (ii) a state of charge (SOC) sensor configured to measure a SOC of a battery system configured to power the electric motor;
   determining, by a controller of the electrified vehicle, a fuel reserve to maintain in the fuel tank, wherein the fuel reserve is only to be used by the engine to support a heating system of the electrified vehicle configured for at least window heating and/or defrosting;
   controlling, by the controller, the electrified powertrain to maintain the fuel reserve in the fuel tank, wherein the fuel reserve is a threshold amount above a minimum amount of fuel that is kept in the fuel tank while indicating that the fuel tank is fully depleted;
   detecting, by the controller, an operating condition of the electrified vehicle when (i) the fuel tank is depleted down to the fuel reserve, (ii) the battery system SOC is at or below a minimum SOC propulsion threshold, and (iii) an ambient temperature is at or below a cold soak temperature threshold; and
   in response to detecting the electrified vehicle operating condition, temporarily powering, by the controller, the engine using the fuel reserve in the fuel tank and utilizing, by the controller, the engine to support the heating system for at least window heating and/or defrosting.

10. The energy management method of claim 9, wherein the heating system is further configured for in-cabin heating while supported by the engine.

11. The energy management method of claim 9, wherein the minimum amount of fuel kept in the fuel tank is for protection from sediments and/or cavitation.

12. The energy management method of claim 9, wherein the minimum SOC propulsion threshold is greater than a minimum SOC operation threshold for preventing potential over-depletion degradation of the battery system.

13. The energy management method of claim 12, wherein the controller is configured to control the electric motor of the electrified powertrain in a torque-limited manner using the battery system SOC in excess of the minimum SOC operation threshold.

14. The energy management method of claim 9, further comprising providing an ambient temperature sensor configured to measure the ambient temperature.

15. The energy management method of claim 9, wherein the controller is configured to control the electrified powertrain to maintain the fuel reserve in the fuel tank in response to an enablement signal.

16. The energy management method of claim 15, wherein the enablement signal is generated in response to a driver input or in response to detection of another set of one or more enablement conditions.

17. The energy management system of claim 1, wherein the cold soak temperature threshold is approximately −15 degrees Celsius.

18. The energy management method of claim 9, wherein the cold soak temperature threshold is approximately −15 degrees Celsius.

* * * * *